Figure 1:
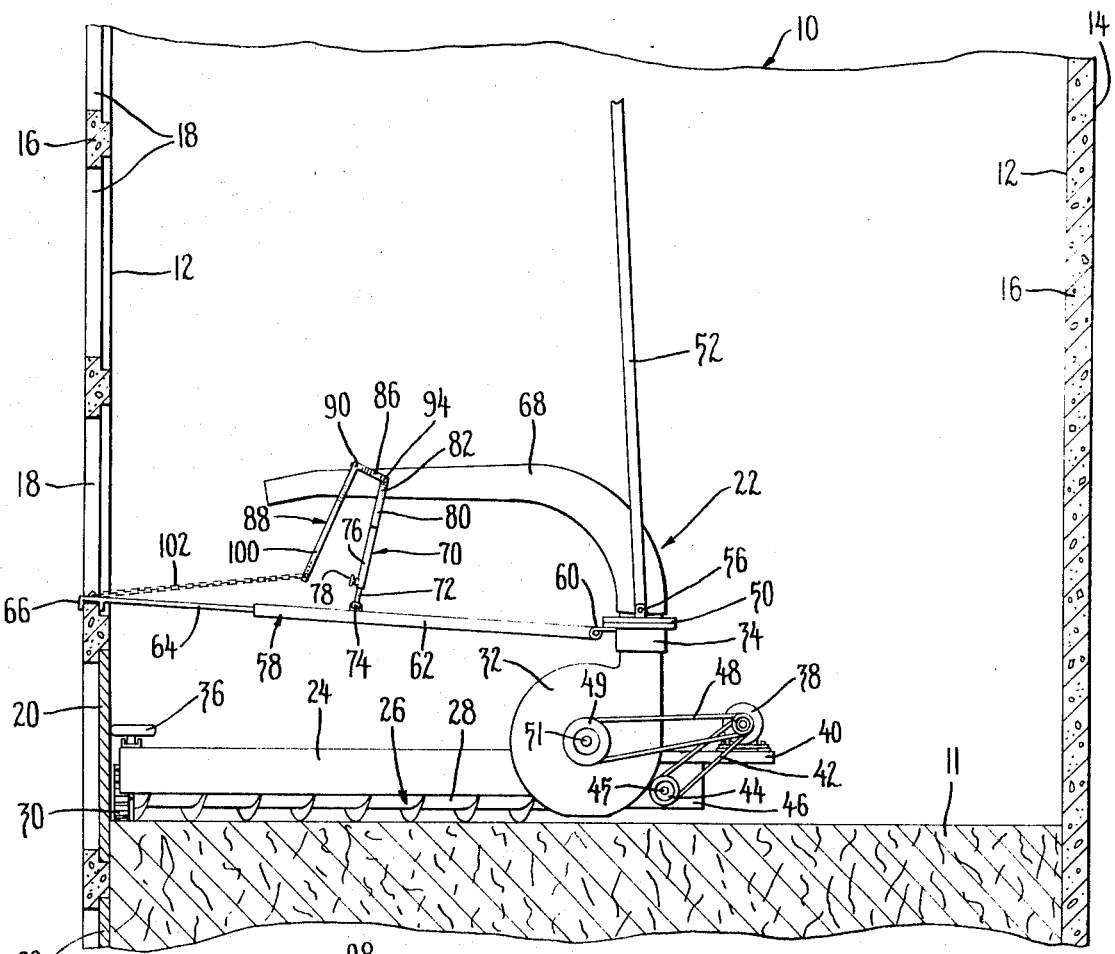

United States Patent
Milchner

[15] 3,653,520
[45] Apr. 4, 1972

[54] SILO UNLOADER DISCHARGE SPOUT AIMING SYSTEM

[72] Inventor: Erich G. Milchner, Oconto Falls, Wis.
[73] Assignee: Badger Northland Inc., Kaukauna, Wis.
[22] Filed: Dec. 10, 1970
[21] Appl. No.: 96,822

[52] U.S. Cl. .................................. 214/17 DB, 302/56
[51] Int. Cl. ............................................. B 65g 65/38
[58] Field of Search ......................... 214/17 DB; 302/56

[56] References Cited

UNITED STATES PATENTS 2,995,260 8/1961 McCann et al. ................. 214/17 DB
3,065,996 11/1962 Patz et al. ..................... 214/17 DB X Primary Examiner—Robert G. Sheridan
Attorney—Gerhardt, Greenlee & Farris

[57] ABSTRACT

A silo unloader for removing silage from a silo which includes a rotatable elongated frame, a silage collecting auger, a discharge conveyor assembly with impellers to blow the silage through openings in the silo wall, a discharge spout for directing silage blown from the discharge conveyor assembly through the openings in the silo walls and a discharge spout aiming device. The aiming device includes a torque arm with one section telescopically received in a second section, a support with adjustable length pivotally attached to the torque arm and a bell crank. The bell crank is pivotally attached to the discharge spout, has one arm pivotally attached to the support and has the other arm attached to the silo wall.

4 Claims, 3 Drawing Figures

INVENTOR.
ERICH G. MILCHNER

INVENTOR.
ERICH G. MILCHNER
BY
ATTORNEYS.

SILO UNLOADER DISCHARGE SPOUT AIMING SYSTEM

This invention relates to an apparatus for removing silage from an upright cylindrical silo with a vertical silo chute on the outer wall by collecting silage from the surface of the silage in the silo and conveying the silage through apertures in the wall of the silo and into the vertical silo chute. Specifically, this invention is directed to an improved control for the discharge spout on the silo unloader to insure that the discharge spout directs silage through the apertures in the silo wall.

The discharge spout for directing silage through apertures in the silo wall must be correctly aimed at all times. It is difficult to keep the discharge spout correctly aimed due to the movement of the silo unloader. The silo unloader descends from the top of the silo to the bottom as silage is removed. The outlet for silage from the silo unloader conveyor assembly to the discharge spout moves in a circle when the silo unloader is in operation since the outlet for the silo unloader conveyor assembly is not at the center of the silo.

The silo unloader of this invention includes an elongated rotatable frame with inboard and outboard ends. A silage collecting means is attached to the frame for engaging the surface of the silage in the silo and for conveying silage toward the inboard end of the frame. A conveyor assembly is mounted on the inboard end of the frame for receiving silage from the collecting means. A motor is mounted on the elongated rotatable frame to propel the outboard end of the frame along the inner surface of the silo wall to drive the silage collecting means and the conveyor assembly. A torque arm is provided with one end pivotally and rotatably attached to the rotatable frame and a second end supported by the silo. A support is pivotally attached to the torque arm. A discharge spout is pivotally attached to, and rotatable relative to, the rotatable frame for directing silage from the conveyor assembly through the apertures in the silo wall. A bell crank, which is pivotally attached to the spout, has one leg pivotally attached to the support on the torque arm, and the other leg connected to the wall of the silo to control the discharge spout.

Figure 2:
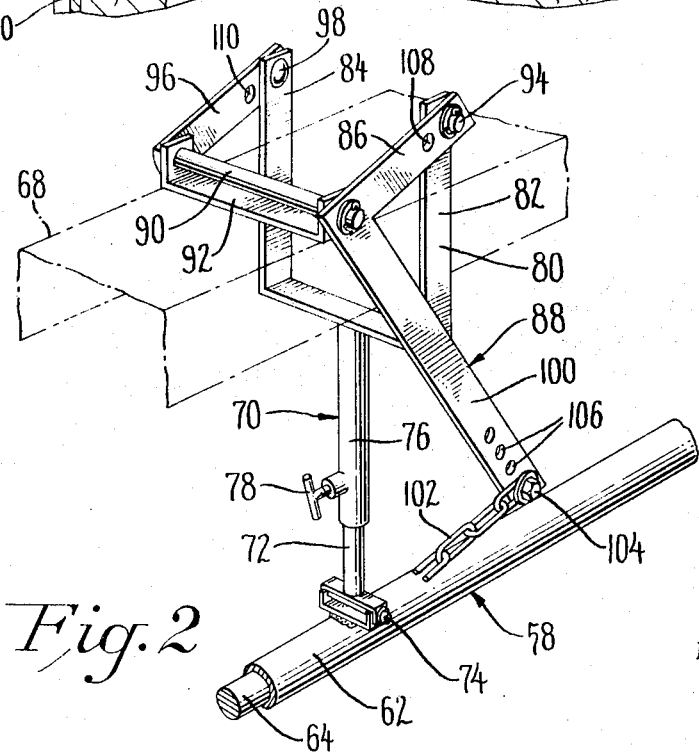
Figure 3:
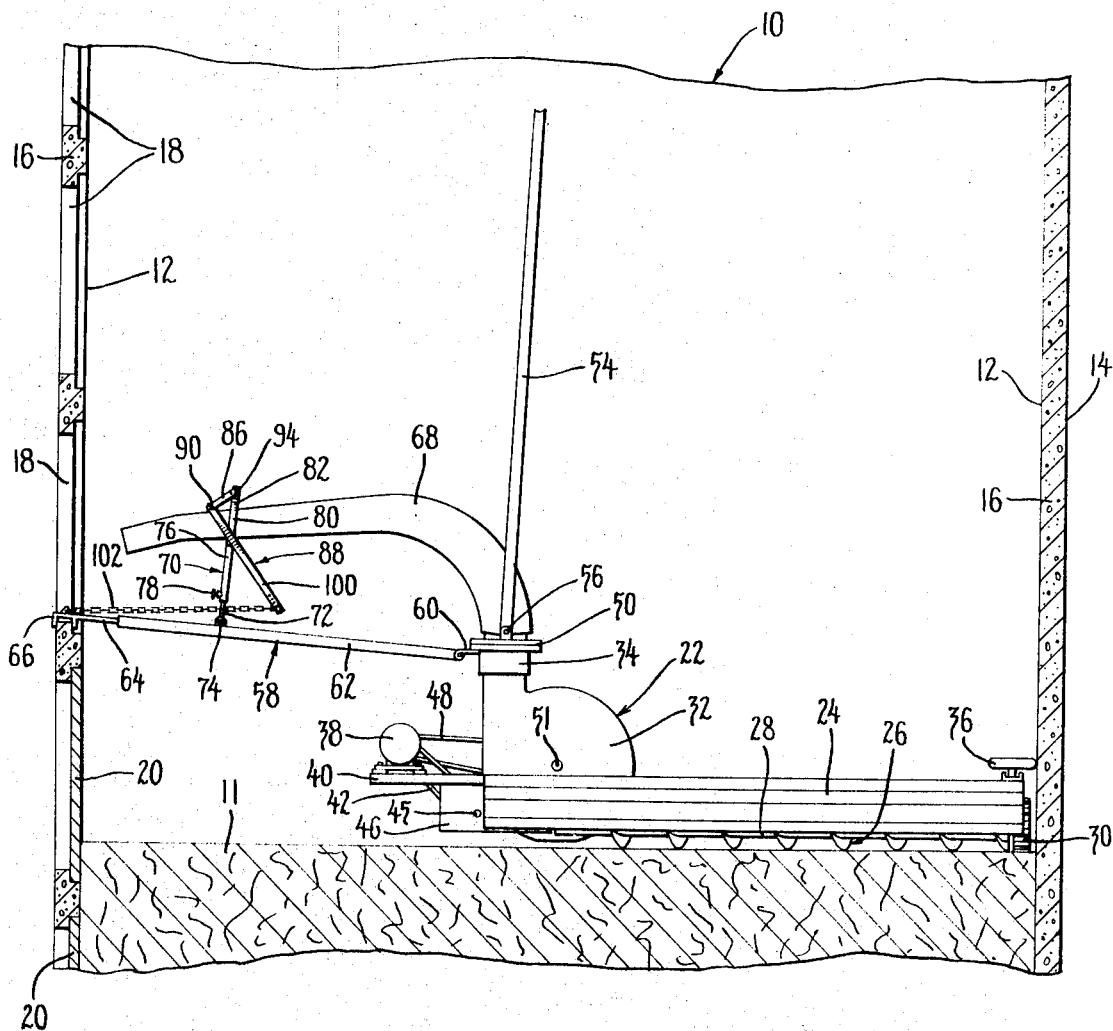

In order that the invention may be more clearly understood, an embodiment will now be described with reference to accompanying drawings in which:

FIG. 1 is a vertical sectional view of a portion of a silo and a silo unloader embodying the improved discharge spout aiming system of this invention with the silage collecting means under the discharge spout, FIG. 2 is an enlarged perspective view of the discharge spout aiming assembly, a portion of the torque arm, the adjustable support on the torque arm and a portion of the discharge spout (illustrated by broken lines); and FIG. 3 is a sectional view of the silo similar to FIG. 1 showing the silage collecting means on the opposite side of the silo from the discharge spout.

The silo unloader of this invention is for use in automatically removing silage from a standard circular upright silo 10, as shown in FIG. 1. The walls of the silo 10 include an inner surface 12 and an outer surface 14. A vertical chute (not shown) is normally mounted on the outer surface 14 of the silo wall. A plurality of rectangular apertures 18 in a vertical row provide openings in the silo wall 16 between the inside of the silo and the vertical chute. Doors 20 are provided to cover the rectangular apertures 18 in the silo wall 16.

The silo unloader 22 has an elongated rigid frame 24 with an inboard end near the center of the silo 10 and an outboard end adjacent the inner surface 12 of the silo wall, as shown in FIG. 1. An elongated silage collecting means 26 is attached to the elongated rigid frame 24 for collecting silage and conveying it toward the inboard end of the silo unloader 22. The elongated silage collecting means 26 illustrated in FIGS. 1 and 3 is a single screw conveyor 28. The elongated silage collecting means 26 could include two augers, a chain conveyor, or a number of other arrangements, if such were desired. A cutter 30 is mounted on the outboard end of the auger 28 to loosen material adjacent to the inner surface 12 of the silo wall 16.

A discharge conveyor assembly 32 is mounted on the inboard end of the elongated rigid frame 24. The discharge conveyor assembly 32 includes a plurality of impellers (not shown) which receive silage from the elongated silage collecting means 26 and blow it through a substantially vertical discharge duct 34.

At least one guide wheel 36 is rotatably journalled to the outboard end of the elongated rigid frame 24 for rotation about a vertical axis. The guide wheel 36 prevents the cutter 30 from engaging the inner surface 12 of the silo wall 16. The guide wheel 36 and the outboard end of the elongated rigid frame 24 is propelled along the inner surface 12 of the silo wall 16 by a drive assembly (not shown). A number of different drive assemblies which are well known in the art could be used to propel the outboard end of the elongated rigid frame 24 along the inner surface 12 of the silo walls 16.

An electric motor 38 is adjustable supported on extensions 40 to the inboard end of the elongated frame 24 of the silo unloader 22. The motor 38 drives a belt 42 which in turn drives a pulley 44 on the input shaft 45 of the gear box 46. The auger 28 is attached to and driven by one of the output shafts on the gear box 46. Another output shaft on the gear box 46 drives the drive assembly for propelling the outboard end of the silo unloader 22 along the inner surface 12 of the silo wall 16. The discharge conveyor assembly 32 is driven by the motor 38 through a belt 48 which drives the pulley 49 connected to the shaft 51 supporting the impellers.

A rotatable collar 50 is attached to the vertical discharge duct 34 on the discharge conveyor 32. A pair of arms 52 and 54 are pivotally attached by fasteners 56 to the rotatable collar 50. The arms 52 and 54 are in turn connected to a cable which is supported by a pulley (not shown) at the top center of the silo. The cable connected to the arms 52 and 54 is used to raise the silo unloader 22 to the top of the silo 10 when the silo is filled. The cable attached to the arms 52 and 54 is also used to lower the silo unloader 22 at a controlled rate so the upper surface of the silage 11 is in a substantially horizontal plane during the silo unloading operation. Since the horizontal distance from the fasteners 56 to the point at which the guide wheel 36 is in contact with inner surface 12 of the silo wall 16 is greater than one-half the diameter of the silo, the arms 52 and 54 always exert a force on the silo unloader 22 tending to hold the guide wheel 36 in contact with the inner surface 12 of the silo wall 16. A torque arm assembly 58 is pivotally attached to the rotatable collar 50 by a bracket 60, for pivotal movement about a horizontal axis. The torque arm assembly 58 includes a tubular section 62 and a shaft section 64 slideably received inside the tubular section 62. A C-shaped section 66 rigidly connected to the outer end of the shaft section 64 of the torque arm assembly 58 attaches to the silo wall 16 in the apertures 18. The torque arm assembly 58 prevents the rotatable collar 50 from rotating relative to the silo 10 when the outboard end of the elongated frame 24 is propelled along the inner surface 12 of the silo wall 16. It is necessary for the torque arm 58 to have one section telescopically received by the other section, since the axis of the vertical discharge duct 34 is spaced from the vertical axis of the silo.

A discharge spout 68 is pivotally attached to the rotatable collar 50 by the fasteners 56 for pivotal movement relative to the rotatable collar 50 about a horizontal axis. The bottom portion of the discharge spout 68 is normally open, as shown in FIG. 2 to prevent plugging.

The aiming device for the discharge spout 68 includes a support assembly 70 and a bell crank 88. The support assembly 70 includes a shaft 72 which is pivotally attached to the tubular section 62 of the torque arm assembly 58 by a pin 74. The shaft 72 is telescopically received in a tube 76. An adjustment screw 78 holds the tube 76 in any selected position relative to the shaft 72. A U-shaped bracket 80 with upstanding legs 82 and 84 is welded to the tube 76. The discharge end of the discharge spout 68 passes between the upstanding legs 82 and 84 of the U-shaped bracket 80.

The bell crank 88 is pivotally attached to the discharge spout 68 by a pin 90 and a bracket 92. The bracket 92 is rigidly attached to the discharge spout 68. The free end of the arm 86 of the bell crank 88 is pivotally attached to the upstanding leg 82 of the support assembly 70 by a pin 94. An arm 96 is pivotally attached to the upstanding leg 84 of the support assembly 70 by a pin 98 and to the discharge spout 68 by the pin 90 and the bracket 92 to hold the U-shaped bracket 80 in proper alignment relative to the discharge spout 68. The arm 100 of the bell crank 88 has a chain 102 attached to its free end by a bolt 104 which is in one of a series of holes 106. The other end of the chain 102 is attached to the C-shaped bracket 66 which is in turn attached to the wall 16 of the silo in one of the openings 18.

The aiming device includes a number of adjustments. The discharge spout 68 may be raised or lowered relative to the torque arm 58 by adjusting the length of the support assembly through the adjustment screw 78. The effective length of the arm 86 of the bell crank 88 and the arm 96 can be adjusted by placing pins 94 and 98 in any of the holes 108 and 110 respectively. The effective length of the arm 100 of the bell crank 88 may be adjusted by bolting the chain 102 in a different one of the holes 106. The effective length of the chain 102 may be adjusted by placing the bolt 104 in a different link.

In operation, the motor 38 drives the gathering means 26, the discharge conveyor assembly 32, and propels the outboard end of the elongated frame 24 along the inner surface 12 of the silo wall 16, thereby rotating the elongated frame 24 about the vertical axis of the silo. The discharge conveyor assembly 32 receives silage 11 conveyed to the center of the silo 10 by the auger 28 and throws the silage up through the vertical discharge duct 34 which is offset to one side of the center line of the silo. The discharge spout 68 changes the direction of movement of the silage thrown through the vertical discharge duct 34 of the discharge conveyor assembly 32 and directs it through one of the openings 18 in the silo wall 16.

The discharge spout 68 is controlled by the aiming device and by a torque arm assembly 58, which prevents the discharge spout 68 from turning relative to the silo 10 when the elongated rigid frame 24 is rotated about the vertical axis of the silo 10. As the guide wheel 36 moves along the inside surface 12 of the silo wall 16 and away from the openings 18 and doors 20 the vertical discharge duct 34 moves in a circle and toward the openings 18. This results in the shaft 64 sliding into the tube 62 and thereby shortening the total length of the torque arm assembly 58. Since the length of the chain 102 is constant, the bell crank 88 moves from the position shown in FIG. 1 to the position shown in FIG. 2 as the guide wheel moves along the inside surface 16 and away from the openings 18, thereby lowering the discharge end of the discharge spout 68.

As the guide wheel 36 moves along the inside surface 12 of the silo wall 16 from the position shown in FIG. 2, and toward the openings 18 and doors 20, the vertical discharge duct 34 moves in a circle and away from the openings 18. This results in shaft 64 sliding out of the tube 62 and thereby increases the total length of the torque arm 58. Since the length of the chain 102 is constant, the bell crank 88 moves from the position shown in FIG. 2 to the position shown in FIG. 1, thereby raising the discharge end of the discharge spout 68.

By employing the aiming device disclosed above, the discharge spout 68 is accurately controlled and all the silage discharged from the conveyor 32 is directed through one of the openings 18. The aiming device also makes it possible to remove more silage 11 before the torque arm assembly 58 must be moved from one of the openings 18 to a lower opening 18.

I claim:

1. A silo unloader for removing silage from an upright cylindrical silo having at least one aperture in its wall including, an elongated rotatable frame with inboard and outboard ends, a silage collecting means attached to the rotatable frame for engaging the top surface of the silage in the silo and for conveying silage toward the inboard end of the frame, a discharge conveyor assembly mounted on the inboard end of the frame for receiving silage from the inboard end of the silage collecting means, a motor mounted on the frame to propel the outboard end of the frame along the inner surface of the silo wall to drive the silage collecting means and the discharge conveyor assembly, a variable length torque arm with one section pivotally and rotatably attached to the elongated rotatable frame and a second section supported by the silo wall, a support pivotally attached to said variable length torque arm, a discharge spout connected to the rotatable frame for rotation relative to the rotatable frame for directing silage from said discharge conveyor assembly through an aperture in the silo wall, and a bell crank pivotally attached to the discharge spout and having one arm pivotally attached to said support and means connecting the other arm of the bell crank to the silo to control the discharge spout.

2. The silo unloader of claim 1 wherein the length of the support pivotally attached to the variable length torque arm is adjustable.

3. The silo unloader of claim 2 wherein the effective length of each arm of the bell crank is adjustable.

4. The silo unloader of claim 1 wherein the effective length of each arm of the bell crank is adjustable.

* * * * *